United States Patent [19]

Van Raamsdonk et al.

[11] 4,374,223

[45] Feb. 15, 1983

[54] ELASTIC COVER OF AN ELASTOMERIC MATERIAL

[75] Inventors: Cornelis Van Raamsdonk, Schortens; Johann Wartusch, Vellmar, both of Fed. Rep. of Germany

[73] Assignees: Olympia Werke AG, Wilhelmshaven; Licentia Patent-Verwaltungs-GmbH, Frankfurt am Main, both of Fed. Rep. of Germany

[21] Appl. No.: 141,699

[22] Filed: Apr. 18, 1980

[30] Foreign Application Priority Data

Apr. 18, 1979 [DE] Fed. Rep. of Germany ....... 2915643

[51] Int. Cl.[3] .......................... B41J 3/04; C08K 5/05; C08K 3/34

[52] U.S. Cl. .................................... 524/245; 524/114; 524/352; 524/353; 524/377; 524/445; 524/451; 524/462; 524/563; 524/566; 525/281; 525/375

[58] Field of Search ..................... 260/30.4 A, 30.4 N, 260/30.8 R, 23.7 M, 23.7 N, 29.6 MN 42.37, 42.28, 42.12, 23 AR, 32.6 A, 32.6 N; 525/329, 281, 375, 336; 524/114, 377, 352, 353, 451, 445, 462, 563, 566, 245

[56] References Cited

U.S. PATENT DOCUMENTS

| | | | |
|---|---|---|---|
| 2,922,773 | 1/1960 | Coler et al. | 260/32.6 |
| 3,268,377 | 8/1966 | Visnov | 525/281 |
| 3,345,325 | 10/1967 | Martin | 260/42.37 |
| 3,445,396 | 5/1969 | Funatsu et al. | 525/6 |
| 3,464,949 | 9/1969 | Wartman et al. | 524/245 |
| 3,551,372 | 12/1970 | Bader at al. | 524/563 |
| 3,625,915 | 12/1971 | Meurchin et al. | 524/245 |
| 3,755,517 | 8/1973 | Clancy et al. | 521/64 |
| 3,855,165 | 12/1974 | Aron | 260/23.7 M |
| 3,873,494 | 3/1975 | Lewis | 260/42.37 |
| 3,923,936 | 12/1975 | Davis et al. | 521/140 |
| 3,965,215 | 6/1976 | Lopez et al. | 525/319 |
| 3,975,325 | 8/1976 | Long | 525/6 |
| 3,989,643 | 11/1976 | Aron | 260/23.7 M |
| 4,124,655 | 11/1978 | Koehnlein et al. | 524/563 |
| 4,201,698 | 5/1980 | Itoh et al. | 525/105 |
| 4,209,333 | 6/1980 | Ong et al. | 260/29.6 XA |
| 4,210,556 | 7/1980 | Castro et al. | 525/6 |
| 4,216,134 | 8/1980 | Brenner | 525/281 |
| 4,250,269 | 2/1981 | Buckman et al. | 525/6 |
| 4,263,075 | 4/1981 | Bowerman et al. | 525/375 |
| 4,267,278 | 5/1981 | Lindner et al. | 525/6 |
| 4,298,710 | 11/1981 | Ohya et al. | 260/32.6 N |

FOREIGN PATENT DOCUMENTS

| | | | |
|---|---|---|---|
| 2750095 | 5/1978 | Fed. Rep. of Germany | 524/245 |
| 53-58568 | 5/1978 | Japan | 524/245 |
| 1221714 | 2/1971 | United Kingdom | 524/249 |

OTHER PUBLICATIONS

Derwent Abstract 69589A/39 Toyo ink "Water Soluble Butadiene Polymer Prod. . . . " Aug. 22, 1978, (J53096094).

Derwent Abstract 34973W/21 Hitachikk "Polybutadiene Allyl Cyanurate for Insulating Tapes . . . "Feb. 10, 1974 (149104199).

Derwent Abstract 22301B/12 Shinetsu Chem Indikk (DT2837117) "Elastomer Compsn. Contg. Organic Rubber . . . "Mar. 15, 1979.

Derwent Abstract 67871V/39 "Heat & Oil Resist Vulcanizates . . . "DuPont (Sep. 2, 1974) (BE-814-634).

Derwent Abstract. 06766B/04 Hitachi Cable "Easily Workable Thermosetting Resin Compsns. . . . "(J53142456) Dec. 12, 1978.

Derwent Abstract DT2714344 enclosed Olympia H9974A/41 "Ink Jet Printer. . . " 5-10-1978.

Derwent Abs. D6238Y/18 (DT2546908 enclosed) "Cover for Ink Outlets . . . "Apr. 28, 1977 Olympia.

Derwent Abstract 55262A/31 (DT 2702663) "Silicone Rubber Elastomer Seal . . . Jul. 27, 1978 Olympia.

*Primary Examiner*—John C. Bleutge

*Assistant Examiner*—Herbert Lilling

*Attorney, Agent, or Firm*—Spencer & Kaye

[57] ABSTRACT

An elastic covering for closing off a nozzle outlet area containing at least one nozzle orifice of an ink printing head filled with an aqueous liquid comprising a polar elastomer, a hydrophilic additive, and at least one ingredient selected from the group consisting of cross-linking agents, activators, and accelerators.

13 Claims, No Drawings

ELASTIC COVER OF AN ELASTOMERIC MATERIAL

BACKGROUND OF THE INVENTION

The present invention relates to elastic coverings made of an elastomeric material and the use of these coverings to close off or seal the nozzle outlet area on the ink printing head of an ink ejection system used in ink jet printing.

The ink printing head of an ink ejection system is filled with ink for printing purposes and filled with ink or another fluid, such as a neutral, aqueous liquid for purposes of transportation and storage. The nozzle outlet area must be closed off or sealed from the atmosphere during relatively long periods of inactivity, during transportation, and during storage. For closing off the nozzle outlet area and the nozzle orifices emanating therefrom, use should be made not only of the elastic characteristic of elastomeric materials, but also, particularly, the viscoelastic (flow) behavior of these elastomers for filling up exceedingly small cavities and interstices in the zone of the closed nozzle outlet area. The nozzle zone of ink printing heads is sensitive to contamination caused, for example, by paper fibers and dust accumulations. Contamination in the nozzle zone leads, with secondary effects, to an altered nozzle geometry, so that droplets emitted from the nozzle are greatly affected in size, shape, direction, and velocity. In the case of a relatively long inactivity between periods of printing, during transport and storage of the ink printing heads or of the printing units equipped with such printing heads, it is, furthermore, necessary to avoid an excessive thickening of the ink in the aperture regions of the nozzles and leakage of the ink or corresponding fluid by shock during transportation, or the drawing of air into the printing head together with the leakage of ink or fluid.

German Application DOS 2,702,663, discloses an elastic covering for the closing of nozzles of an ink printing head filled with an aqueous liquid, in which the covering consists of an elastomeric material, especially of a silicone rubber. In this arrangement, the viscoelastic (flow) behavior of these elastomeric materials is used to fill up exceedingly small cavities and interstices in the region of the closed nozzle outlet area. In addition to these intentionally emphasized properties, however, these silicone elastomeric materials also exhibit disadvantages due to their inherent properties caused by their chemical structure because silicone rubbers of this type are hydrophobic, i.e. they are water-repellant. Monomers and oligomers separate from these rubber types and remain behind in the nozzle outlet area of the printing head after removal of the sealing material form the area. The nozzle outlet area or portion thereof exhibiting these deposits can, thereafter, no longer be wetted by the ink spread on this area. At the nozzle rim and in the proximity of the nozzle, the symmetry and thus the uniformity of the droplet formation is disturbed. These disturbances lead to an altered breakup characteristic of the droplets and thus to an impairment of the image reproduction on the recording medium. It has been found experimentally that it is impossible to completely suppress these deposits, and the addition of hydrophilic additives to the covering material is not feasible due to the hydrophobic character of the silicone.

SUMMARY OF THE INVENTION

It is an object of the present invention to provide a sealing material for the nozzle outlet area of an ink printing head which leaves deposits with improved properties on the area to be covered by sealing material.

It is a further object of the present invention to provide a sealing material for the nozzle outlet area of an ink printing head which improves the wetting characteristics of the outlet area after the sealing material has been removed.

Additional objects and advantages of the present invention will be set forth in part in the description which follows and in part will be obvious from the description or can be learned by practice of the invention. The objects and advantages are achieved by means of the compositions, instrumentalities, and combinations particularly pointed out in the appended claims.

To achieve these objects and in accordance with its purpose, the present invention provides an elastic covering for closing off a nozzle outlet area containing at least one nozzle orifice of an ink printing head filled with an aqueous liquid, the covering comprising an elastomeric material having viscoelastic properties for filling exceedingly small cavities and interstices in the area to be closed off, wherein the elastomeric material comprises a mixture of a polar elastomer, a hydrophilic additive, and at least one ingredient selected from the group consisting of cross-linking agents, cross-linking activators, and cross-linking accelerators.

It is to be understood that both the foregoing general description and the following detailed description are exemplary, but are not restrictive of the invention.

DETAILED DESCRIPTION OF THE INVENTION

In accordance with the present invention, it has been found that mixtures containing a polar elastomer and other defined components are especially well suited for providing a covering for sealing the nozzle outlet area of ink printing heads. Elastomers are high polymer substances having the property of extensibility with elastic recovery.

Two classes of polar elastomers are especially preferred for use in the present invention, namely butadiene-acrylonitrile copolymers and ethylene-vinyl acetate copolymers. Butadiene-acrylonitrile copolymers (NBR) are nitrile type rubbers which are formed from the reaction of butadiene and acrylonitrile. The ratio of butadiene to acrylonitrile generally varies from 82:18 to 55:45. These copolymers may be cured with both sulfur and non-sulfur containing vulcanizing or cross-linking agents, with the possible addition of a cross-linking activator or accelerator. Fillers are also used with NBR to improve properties.

The ethylene-vinyl acetate copolymers (EVA) which are the second class of elastomers preferred for the covering compositions of the present invention have a ratio of ethylene to vinylacetate from 75:25 to 40:60 and are similarly used with cross-linking agents, activators, and fillers.

Combinations of certain polar elastomers may also be useful in the present invention.

The mixture of the present invention contains a hydrophilic additive. The hydrophilic additive is, in general, a surfactant. Ethylene oxide adducts are especially suitable as a hydrophilic additive for use in the present invention. Examplary of suitable ethylene oxide adducts are adducts or ethylene oxide with low molecular weight or fatty alcohols, adducts of ethylene oxide with fatty acids, adducts of ethylene oxide with amines, and low molecular weight ethylene oxide adducts with end-positioned alcoholic OH-groups (polyethylene glycols).

The adducts of ethylene oxide with fatty alcohols which can be used are, for example, nonionic surfactants, generally of the formula $R—(OCH_2CH_2)_n—OH$ where R is an alkyl group with about 8 to 18 carbon atoms, and n is about 2 to 25. They are sold under trade names such as Neodol (Shell Chemical), Tergitol (Union Carbide) and Genapol (Hoechst). Also, adducts of ethylene oxide with propyl or butyl alcohol are suitable hydrophilic additives according to this invention.

The adducts of ethylene oxide with fatty acids, which can be used are, for example, surfactants generally of the formula $R—CO\ (OCH_2CH_2)_n\ OH$ wherein R is an alkyl group having about 8 to 18 carbon atoms, n is about 2 to 25. These are sold under the trade name of Genagen by Hoechst.

The adducts of ethylene oxide with amines which can be used are, for example, generally of the formula $R—CH_2—N=[(CH_2CH_2O)_nH]_2$ wherein R is an alkyl group having about 8 to 18 carbon atoms, and n is about 2 to 25. They are sold under the trade name Genamin by Hoechst.

The low molecular weight polyethylene glycols, which are ethylene oxide adducts with end-positioned alcoholic OH-groups, which can be used are, for example, compounds which have a molecular weight of about 200 to 800 and are of the general formula $H(OCH_2CH_2)_n\ OH$ and are sold under the trade name Carbowax by Union Carbide Corporation and Genoplast or Polyethylenglycol resp. by Hoechst.

Mixtures of the above surfactants are also suitable. Further it is possible to additionally include minor amounts (0.001–0.5 weight %) of certain specific wetting agents such as those based on fluorocarbons. One such type of wetting agents is a sulfonamide ethylene oxide adduct with perfluoroalkyl residue.

In accordance with the present invention, at least one ingredient selected from the group consisting of cross-linking agents, cross-linking activators, cross-linking accelerators, and mixtures thereof, is combined with the polar elastomer and the hydrophilic additive. Exactly which of these substances will be used and in what proportions will depend on the particular elastomer and the property desired.

Typically, compounds such as tetramethylthiuram disulfide (thiuram)

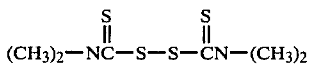

are used as vulcanizing agents for NBR. Organic peroxides are also well known cross-linking agents. Typical peroxide accelerators include di-tert-butyl peroxide and dicumylperoxide. A typical cross-linking activator would be triallylcyanurate.

Additives well known to the polymer technique may also be used in conjunction with the present compositions. These include dispersing agents, softening agents, pigments, fillers, plasticizers, antioxidants, aging retardants, and hydrolysis protection agents. Typical fillers known to the polymer art which can be used include, for example, various forms of silica, clay and talc.

The use of polar elastomers, in particular NBR and EVA, in conjunction with the recited hydrophilic additives and wetting agents, is especially advantageous in that an elastic covering material is achieved which is compatible with the aqueous ink or aqueous fluid which fills the ink printing head. The compositions of the present invention dissolve and absorb undesirable, partially thickened ink residues which contact the elastic covering, and thus provide a self-cleaning action. Further, the nonionic, water soluble wetting additive has a surfactant effect on the nozzle outlet area. Surprisingly, the elastic covering material of the present invention has the further advantage that the additives which impart the hydrophilic properties of the composition, such as polyethylene glycol, reinforce the viscoelastic flow behavior of the elastomer, so that the force required for the sealing effect can be considerably reduced.

It has also been discovered that portions of the hydrophilic additive transferred to the nozzle outlet area after the covering is removed are replenished in the surface of the covering material by migration from the center of the material towards the surface. The interface of the covering material with the ink printing head thus retains its hydrophilic character even after frequent usage.

The use of the hydrophilic additive in the sealing material thus promotes its wettability by ink, so that after removal of the covering, ink will remain on the surface of the covering and impurities from the surroundings will increasingly be incorporated into the surface of the covering material.

The following examples are given by way of illustration to further explain the principles of the invention. These examples are merely illustrative and are not to be understood as limiting the scope and underlying principles of the invention in any way. All percentages referred to herein are by weight unless otherwise indicated.

The following examples show compositions which are elastomeric mixtures suitable for use as a covering material according to the present invention. The compounds are introduced into the compositions essentially in the indicated sequence, and are incorporated by kneading or milling. Where trade names for compounds are used, the manufacturer is indicated.

EXAMPLE 1

An elastic covering is made from the following composition:

| | | | |
|---|---|---|---|
| 100 | Parts by weight | Butadiene-acrylonitrile rubber with 38% acrylonitrile | |
| 1.0–3.0 | " | Stearic acid | additional cross-linking accelerator |
| 2.0–5.0 | " | Zinc oxide, active | |
| 0.5–2.0 | " | Methylene bis (tert-butyl-para-cresol (Phenolic antioxidant) | |
| 15.0–25.0 | " | Precipitated silica (filler) | |
| 20.0–40.0 | " | Natural clay (filler) | |
| 10.0–25.0 | " | Phenol/cresol alkanesulfonic acid ester (plasticizer) | |
| 1.5–2.0 | " | "Vulkacit Thiuram" (vulcanizing agent) (Bayer) | |
| 1.0–1.5 | " | "Vulkacit J" (vulcanizing agent) (Bayer) | |
| 0.5–1.0 | " | "Struktol SU 108" (sulfur as vulcanizing agent) (Schill and Seilacher) | |
| 2.0–15.0 | " | "Genoplast 200" (Polyethylene glycol m.w. 200) (Hoechst AG.) | |

The vulcanizing agents used serve to cross-link the composition.

EXAMPLE 2

An elastomeric covering is made from the following composition:

| | | |
|---|---|---|
| 100 | Parts by weight | Ethylene-vinyl acetate copolymer in a ratio of 40:60 |
| 20.0–40.0 | " | Talc (mineral filler) |
| 0.5–1.5 | " | Polycarbodiimide (hydrolysis protection agent) |
| 0.2–1.0 | " | 4,4'-Thio-bis-(6-tert.butyl-metacresol) (Monsanto) (antioxidant) |
| 0.5–2.0 | " | Triallyl cyanurate (cross-linking activator) |
| 3.0–5.0 | " | 1,1-Bis (tert-butylperoxy)-3,3,5-trimethylcyclohexane (cross-linking agent) |
| 2.0–10.0 | " | "Genoplast 200" (polyethylene glycol m.w. 200) (Hoechst AG.) |

It will be understood that the above description of the present invention is susceptible to various modifications, changes and adaptations, and the same are intended to be comprehended within the meaning and range of equivalents of the appended claims.

What is claimed is:

1. An elastic covering for closing off a nozzle outlet area containing at least one nozzle orifice of an ink printing head filled with an aqueous liquid, said covering consisting essentially of an elastomeric material having viscoelastic properties for filling exceedingly small cavities and interstices in the area to be closed off, wherein the elastomeric material comprises a mixture of a polar elastomer selected from the group consisting of butadiene-acrylonitrile copolymer and ethylene—vinyl acetate copolymers, a hydrophillic additive comprised of an adduct of ethylene oxide with amines, and at least one cross-linking ingredient.

2. An elastic covering for closing off a nozzle outlet area containing at least one nozzle orifice of an ink printing head filled with an aqueous liquid, said covering consisting essentially of an elastomeric material having viscoelastic properties for filling exceedingly small cavities and interstices in the area to be closed off, wherein the elastomeric material comprises a mixture of (a) a polar elastomer which is a copolymer of butadiene and acrylonitrile or a copolymer of ethylene and vinyl, (b) a hydrophilic additive comprised of an adduct of ethylene oxide with amines, (c) at least one cross-linking ingredient, (d) a fluorocarbon wetting agent, and (e) an additive selected from the group consisting of dispersing agents, softening agents, pigments, fillers, plastisizers, anti-oxidents, aging retardants, hydrolysis protection agents and mixtures thereof.

3. Elastic covering according to claim 1 or 2 wherein the polar elastomer is a copolymer of butadiene and acrylonitrile.

4. Elastic covering according to claim 1 wherein the cross-linking ingredient is an organic peroxide.

5. Elastic covering according to claim 1 wherein the cross-linking ingredient is triallylcyanurate.

6. Elastic covering for closing off a nozzle outlet area containing at least one nozzle orifice of an ink printing head filled with an aqueous liquid, said covering comprising an elastomeric material having viscoelastic properties for filling exceedingly small cavities and interstices in the area to be closed off, comprising by weight:

100 parts butadiene-acrylontrile copolymer containing 38% acrylonitrile;
1–3 parts stearic acid;
2–5 parts zinc oxide, active;
0.5–2 parts methylene bis (tert-butyl-paracresol) as a phenolic antioxidant;
15–25 parts precipitated silica as a filler;
20–40 parts natural clay as a filler;
10–25 parts phenol/cresol alkanesulfonic acid ester as a plasticizer;
2.5–3.5 parts vulcanizing agent;
0.5–1 parts sulfur as an additional vulcanizing agent; and
2–15 parts polyethylene glycol of molecular weight abbout 200.

7. Elastic covering according to claim 1 or 6 additionally comprising a fluorocarbon wetting agent.

8. Elastic covering according to claim 1 additionally comprising an additive selected from the group consisting of dispersing agents, softening agents, pigments, fillers, plasticizers, antioxidants, aging retardants, hydrolysis protection agents, and mixtures thereof.

9. Elastic covering according to claim 2 wherein the cross-linking ingredient is an organic peroxide.

10. Elastic covering according to claim 2 wherein the cross-linking ingredient is triallylcyanurate.

11. Elastic covering to claims 1 or 2 wherein the adduct of ethylene oxide with amines is of the formula $$R—CH_2—N=[(CH_2CH_2O)_nH]_2$$

wherein R is an alkyl group having about 8 to 18 carbon atoms and n is about 2 to 25.

12. Elastic covering according to claim 1 or 2 wherein the polar elastomer is a copolymer of ethylene and vinyl acetate.

13. Elastic covering for closing off a nozzle outlet area containing at least one nozzle orifice of an ink printing head filled with an aqueous liquid, said covering comprising as elastomeric material having viscoelastic properties for filling exceedingly small cavities and interstices in the area to be closed off, comprising by weight:

100 parts ethylene-vinyl acetate copolymer having an ethylene: vinyl acetate ratio of 40:60;
20–40 parts talc, as mineral filler;
0.5–15 parts polycarbodimide hydrolysis protection agent;
0.2–1 parts age retardant (antioxidant);
0.5–2 parts triallyl cyanurate;
3–5 parts 1-1-Bis (tert-butyl peroxy) -3, 3,5-trimethyl cyclohexane; and
2–10 parts polyethylene glycol of molecular weight about 200.

* * * * *